Aug. 30, 1960 B. L. SITES ET AL 2,951,116
APPARATUS FOR MAKING CORRECTED COLOR SEPARATION RECORDS
Filed Nov. 23, 1956 3 Sheets-Sheet 3
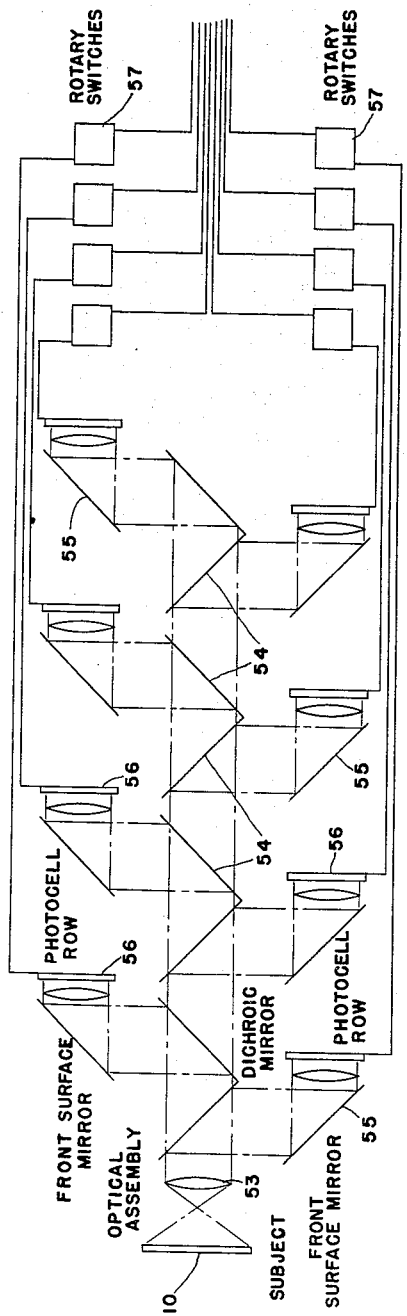
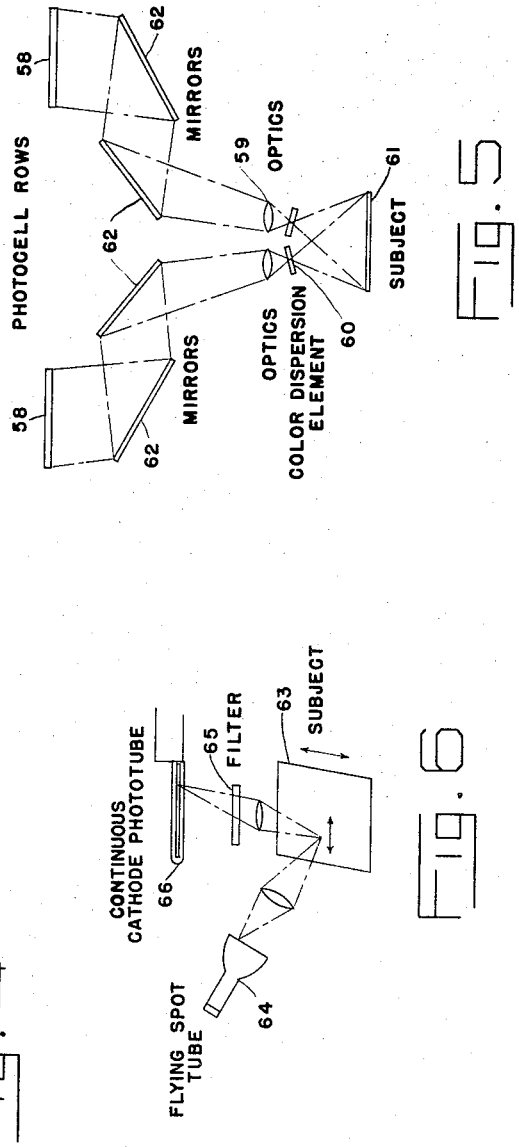
INVENTOR.
BENJAMIN L. SITES
FRANK R. PASCHKE
BY
ATTORNEYS 2,951,116
Patented Aug. 30, 1960

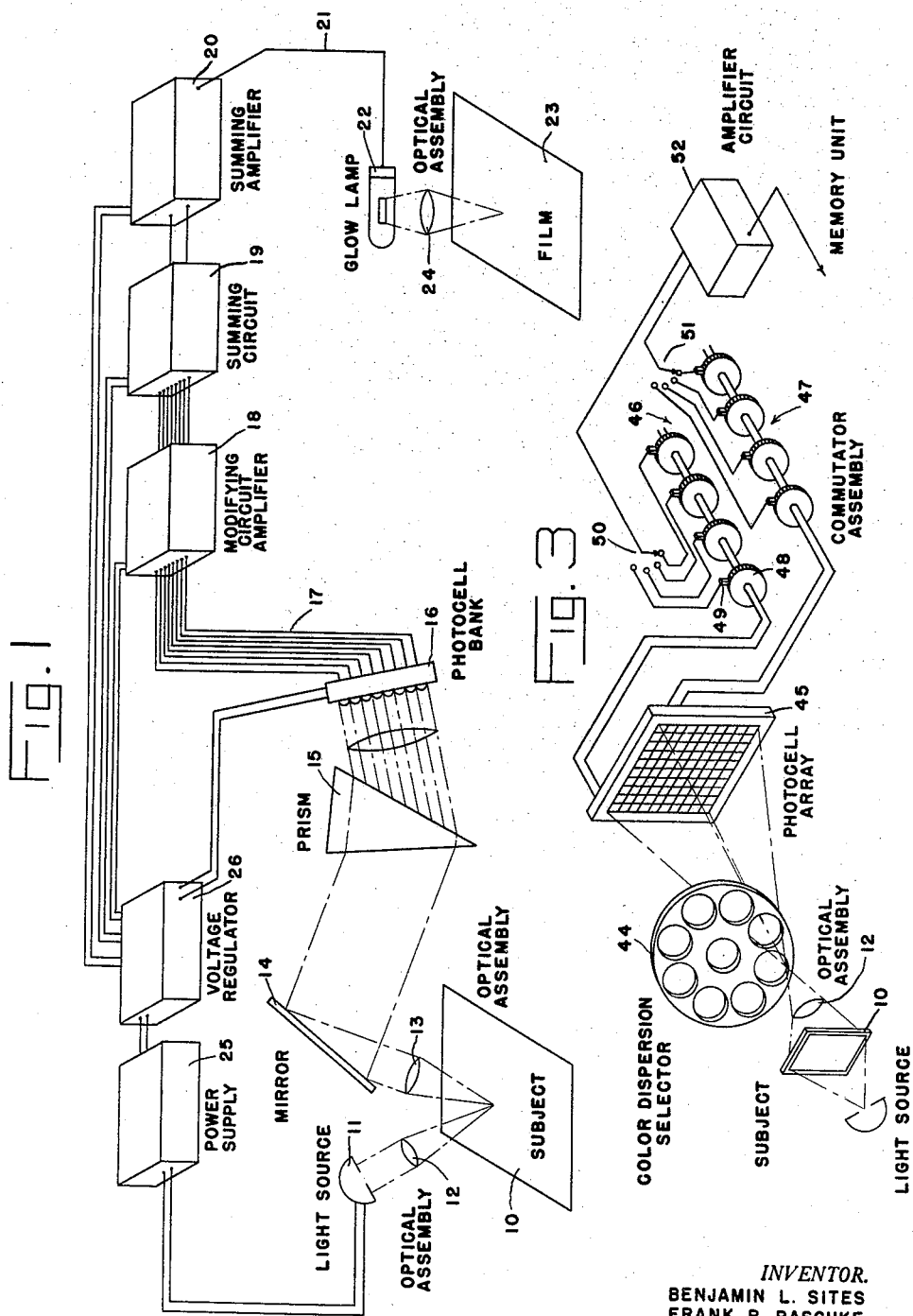

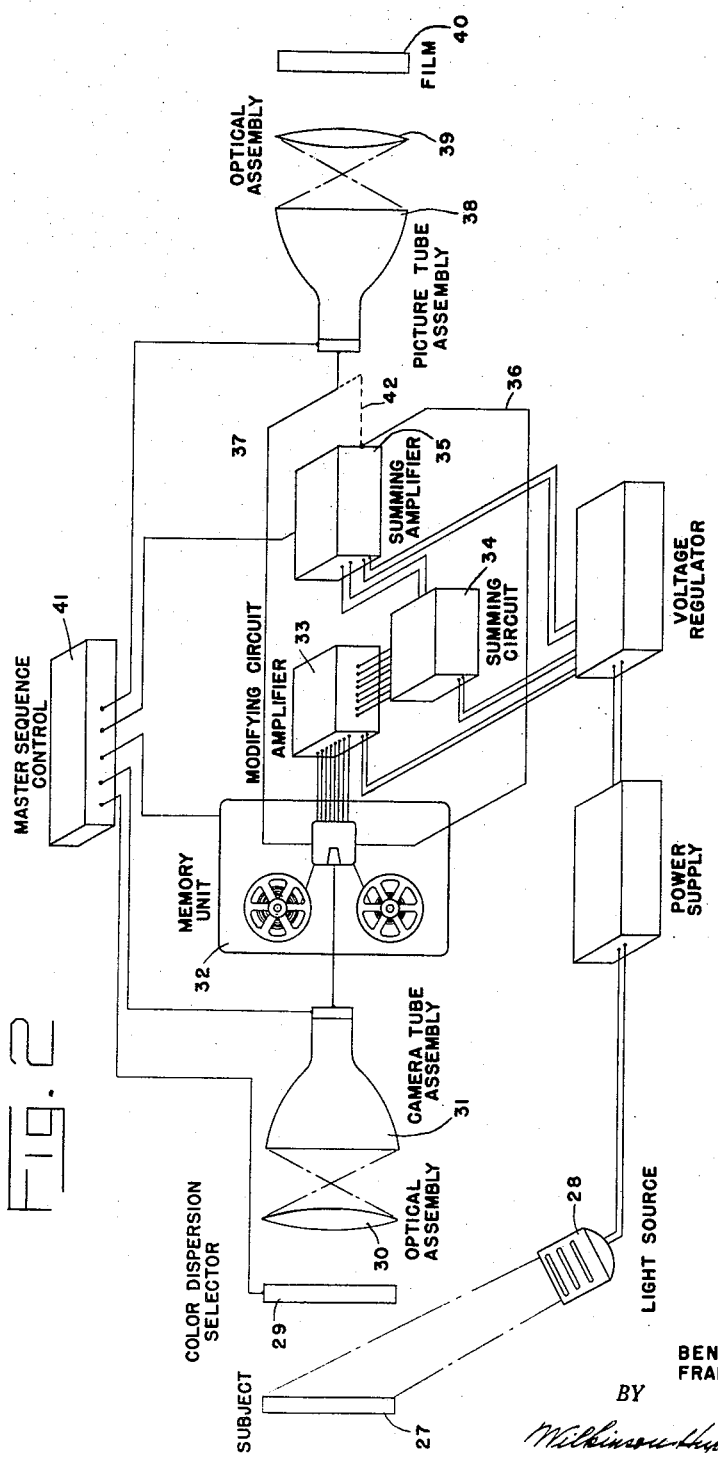

2,951,116

APPARATUS FOR MAKING CORRECTED COLOR SEPARATION RECORDS

Benjamin L. Sites, Elmhurst, and Frank R. Paschke, Bellwood, Ill., assignors to Miehle-Goss-Dexter, Incorporated, a corporation of Delaware Filed Nov. 23, 1956, Ser. No. 624,027

10 Claims. (Cl. 178—5.4)

This invention relates to the art of making color process printing plates for use in the graphic arts to reproduce pictures in natural color. More specifically it pertains to novel and improved apparatus for making high fidelity, corrected color separation records in accordance with the principle disclosed in Patent 2,567,240.

It is a well established fact that the difficulty in making true color reproductions and, as a matter of fact, the principal reason why correction of color separation transparencies is required at all, is because of the inherent deficiencies of the reproduction pigments available, in respect to their spectral reflection characteristics. Thus it becomes necessary to compensate for the limitations of these pigments, by altering the photographic densities of the separation transparencies, in a selective and precise manner, either manually or automatically.

Various systems have been proposed and utilized for making corrected color separation negatives, one group of which is commonly referred to as the masking processes. These systems, which have met with varying degrees of success, involve the use of photographic masking transparencies in conjunction with their respective separation transparencies, whereby corrective variations in density are obtained when exposing the light sensitive material of the corrected transparency to be produced. These systems, however, require a high degree of skill on the part of the photographer and, at best, the results only approach perfection and much hand work is still required before corrected transparencies of commercially acceptable quality are produced.

Other systems utilize three complementary filters, and are based on the assumption that the filters permit the employment of the tri-stimulus concept of color composition proposed by the International Commission on Illumination. Theoretically, this assumption should be correct, but as stated above, due to the deficiencies of the reproducing media, this condition is only approached.

For example, when measuring the spectral reflectance values of a set of three solid primary colors; yellow, cyan and magenta, through their respective separation filters, each indicates a maximum value which can be considered equivalent to 100%. It is logical to assume, therefore, that a similar measurement for a solid secondary color, green for example, would indicate a value of 100% in the yellow and 100% in the cyan separation transparencies. In actual practice, however, such values are not obtained with the pigments in general use because of their reflectance characteristics, and the value for yellow may register only as 60%, whereas the value of cyan may be 80%. Obviously, separation transparencies produced in accordance with these values could not possibly duplicate the original solid green secondary color.

It becomes evident, therefore, that a system for making accurate color separation records, whether they be separation negatives, positives or the actual printing plates, must be calibrated against printed samples of the actual inks and paper to be used in making the reproduction, arranged in a convenient manner, such as a color chart composed of the solid primaries, secondaries, black and white.

In accordance with this invention, the colored subject to be reproduced is illuminated by an appropriate light source. The reflected or transmitted light is then directed by suitable optical means through a spectral dispersion medium such as a prism, a selected set of appropriate filters, etc., which divides the light into a predetermined number of bands of the spectrum, the number of said bands corresponding to the number of colors in the color chart mentioned above which are deemed essential to reproduce the original. The spectral light bands corresponding to the reflected or transmitted light from the subject are converted into electrical signals which are amplified in accordance with predetermined amplification factors based on the reflectivity characteristics of the pigments to be used in making the reproduction, and then combined algebraically in accordance with the sign of their respective amplification factors, to produce a resultant electrical signal representative of a particular primary color separation transparency. This signal may, in turn, be utilized to modulate a recording medium such as a glow lamp or the like to thereby expose a photosensitive film. This principle is more fully described in the Patent 2,567,240.

Thus it will be apparent that with this invention each elemental area in the original colored subject is effectively sensed either simultaneously or sequentially by a relatively large number of spectral bands rather than by only the three primary color bands as represented by the A, B, C filters in general use. Thereafter the electrical signal corresponding to each spectral band is amplified by a predetermined factor which is based directly upon the reflectance characteristics of the pigments in the colors of the color chart, in order to compensate for any deficiencies therein, and combined algebraically, according to the sign of their amplification factor, with the signals of all the other spectral bands to produce a single electrical signal which represents a correct proportionate energy value for the copy element for the particular primary color separation being made.

Thus it is possible to reproduce each color precisely as it appears in the original without the need of masks or preliminary transparencies.

It is one of the primary objects of our invention, therefore, to provide apparatus for producing high fidelity color corrected separation negatives.

It is a further object to provide such apparatus which is capable of extremely high speed operation.

Another object of our invention is to provide a fully automatic device which obviates the need for a highly skilled operator.

A still further object is to provide a color correction apparatus which senses, analyzes and modifies all of the color values of the original in accordance with factors derived directly from the reproducing media.

A further object is to provide apparatus for making corrected primary color separation records directly from the multi-color original without the need of critical masks or uncorrected preliminary transparencies.

Further objects and advantages will become apparent from the following description and accompanying drawings wherein;

Figure 1 is a diagrammatic illustration of one modification of our invention showing the various components of the apparatus and wherein scanning is accomplished by moving the original subject and the recording element in unison relative to the reading and exposing elements respectively or vice versa;

Figure 2 illustrates another embodiment of the invention wherein the color sensing, analyzing and computing means are combined with a closed circuit television and tape recording system for high speed operation and high fidelity reproductions; and Figures 3, 4, 5 and 6 disclose modifications of the reading unit for viewing the subject to be reproduced and converting the resultant light image thereof into a corresponding electrical signal.

In essence, the new and improved apparatus we have devised for producing high fidelity, corrected color separation records, in accordance with the method and/or principle set forth in the earlier Patent 2,567,240, is comprised of three basic units. A reading or viewing unit for converting the light energy from elemental areas of the original image into corresponding electrical energies, a computing or color recognition-correction unit which modulates the electrical energies in accordance with predetermined amplification factors and then mixes the signals algebraically according to the sign of their amplification factor, and a writing or reproducing unit for converting the output of the computing unit into a permanent primary color separation record.

The reading unit may consist of any one of various scanning mechanisms which comprise illuminating means for illuminating either the entire subject or only an elemental area thereof, an optical assembly for collecting the transmitted or reflected light, a spectral dispersion medium which embraces the entire range of the visible spectrum and which separates or disperses the beam of light into its spectral components, and transducer means for converting the light energy in each one of selected spectral color bands into corresponding electrical energies.

The computer or color recognition-correction unit basically comprises a plurality of low distortion, highly stable linear amplifiers which receive the individual electrical energies from the reading unit, amplify them in accordance with predetermined amplification factors, and several summing circuits arranged so as to algebraically combine the individual signals, when said circuits are combined with a differential amplifier circuit or its equivalent, in accordance with the sign of their respective amplification factors to produce a single electrical signal which represents a particular, corrected, primary color separation record.

The writing or reproducing unit in turn may consist of any one of several well known recording or reproducing mediums which comprise mechanism for effectively scanning recording material in unison with the reading unit, the writing or recording element of which is controlled by the single electrical signal produced by the computer unit to record on the recording material a permanent record of a particular color separation.

In Figure 1 of the drawings there is illustrated one embodiment of this invention whereby fully corrected, primary color separation transparencies can be produced directly from any transparent or opaque multi-colored subject in accordance with the principle disclosed in the Sites Patent 2,567,240.

In the drawing, the subject 10 to be reproduced is represented as an oil painting, a colored print, or any other opaque matter and, therefore, it is illuminated from the front by an appropriate light from a light source 11 which light is focused to a point or spot on the surface of the subject by means of a suitable optical assembly 12. It will be appreciated that if the subject is a photographic transparency, such as a Kodachrome or the like, the light source would be located on the opposite side of the subject so that the light rays would be transmitted therethrough.

In either case, actual scanning of the subject whereby each elemental area thereof is illuminated or analyzed in logical sequence, may be accomplished either by translating and indexing the subject relative to a fixed beam of light, or by moving the beam of light, such as in a flying spot scanner tube, relative to a fixed subject as is well known in the art.

As each elemental area of the subject is progressively illuminated, the reflected or transmitted light from the surface thereof is picked up by an optical assembly 13 which collimates the rays and directs them against a reflecting mirror 14. The latter reflects the beam of light through a light dispersion medium, such as the prism 15, wherein the original light is separated or dispersed into its respective spectral components. If convenient, the mirror 14 may be eliminated, in which case the optical assembly 13 would be arranged to direct the light beams directly through the prism 15.

Beyond the prism 15 is a series of photocells 16 which are positioned in the plane of the spectrum and in a manner that each individual cell is activated by the light energy in the particular spectral color band falling upon its surface. In the embodiment illustrated there are eight photocells arranged in eight different color bands. However, the number of photocells employed, and thus the number of color bands of the spectrum in which each elemental area of the original is sensed, is determined by the number of primary, secondary and tertiary colors deemed necessary to reproduce the original subject, plus one. This is in accordance with the principle more fully developed in Patent 2,567,240.

Thus it will be understood that the number of photocells used, or in other words, the number of distinct spectral color bands by which the original is to be analyzed or sensed, is dependent upon the requirements of the original subject and/or the quality desired in the reproductions. For the average, high quality commercial reproductions, however, it is believed that sensing of the original subject in eight bands of the spectrum is adequate in order to faithfully reproduce all of the colors therein. The use of eight discrete bands insures a high fidelity of reproduction by virtue of the much more accurate integration performed in the color recognition process.

Each photocell 16 converts or transforms the light energy in the particular color band falling upon its surface into corresponding electrical energies which are then fed through the respective conductors 17 into a modifying circuit amplifier 18 wherein the individual energies are amplified in accordance with predetermined amplification factors based on the reflectivity characteristics of the pigments and paper to be used in making the reproduction. The method whereby these factors are determined is fully explained in Patent 2,567,240 and it is based upon a color chart made from the actual pigments to be used in printing the reproductions and comprises the solid primary and secondary colors, as well as black and white.

It will be understood that once the amplification factors have been established for a given set of pigments or other reproducing media, they remain fixed and constant as long as those same pigments are used to make or print the reproductions. In the event of a change, the amplification factors must be recalculated in accordance with the reflectivity characteristics of the new media and the modifying circuit amplifier unit adjusted accordingly. Because these factors are based on linear functions rather than on exponential or other non-linear functions, adjustment of the amplifying unit is a simple matter which can readily be accomplished by the operator by means of adjustable controls on the unit without the necessity of changing any of the electronic circuitry.

In the modifying circuit amplifier unit 18 each individual energy is amplified by a separate predetermined amplification factor, of either positive or negative sign as the correction conditions demand. Thereafter, the amplified energies are fed through separate conductors into a summing circuit unit 19 wherein all of the energies of like sign are added together. The two resultant energies are then fed through individual conductors into a differential or summing amplifier unit 20 which adds or combines the two energies algebraically in accordance with the sign of their amplification factor, to produce a single valued electrical signal which represents a particular corrected, primary color separation record.

If in some instances, all of the individual energies for a particular color separation negative have amplification factors of the same sign, either positive or negative, the differential or summing amplifier unit 20 will either be bypassed or operated single ended because the single energy produced by the summing unit 19 will represent the primary color separation record.

In either case, the resultant signal is carried through a conductor 21 and is used to intensity modulate a writing element such as a glow lamp 22, the beam of which is focused to a point or spot on photosensitive film 23 by an optical assembly 24.

Although a glow lamp has been disclosed as the writing or reproducing element in Figure 1, several conventional means may be used for this purpose. For example, the control signal emanating from the amplifier 20 may be used to modulate or excite a hot stylus so as to etch or burn away a plastic printing plate direct, or it can be used to control a magneto-optically or ferro-optically actuated shutter or to position a galvanometer mirror suspension in relation to an aperture which gates the amount of light transferred to the recording medium. On the other hand if a flying spot scanner tube is used as the scanning or reading means, a cathode ray picture tube would preferably be used in combination therewith as the writing element.

In this respect also, the scanning function whereby each elemental area of the recording medium is exposed or acted upon in regular sequence may be accomplished in known manner either by moving the recording medium relative to the recording element or vice versa. It is obvious that the recording is synchronous with the reading.

Moreover, any one of the conventional writing or recording means may be used in combination with any one of the conventional reading or scanning means, the only requirement being that the respective units be so synchronized with each other that each one acts simultaneously upon corresponding elemental areas of the original and the reproduction when the apparatus is in operation.

Power for operating the system is derived from the power supply unit 25 to which the light source 11 may be connected directly if adequate voltage regulation is maintained. Power for the remainder of the system is first fed through a voltage regulator 26 and thence to the respective units as indicated. If permissible, the light source may also receive its power from the voltage regulator.

In Figure 2, another modification of the color separation and correction apparatus is disclosed which is capable of operation at extremely high speeds and which will produce exceptionally fine quality reproductions. This particular arrangement incorporates a closed circuit television system in combination with a memory or storage unit and a series of amplifying and computing units to produce high fidelity, corrected color separation transparencies.

In this system the original subject 27 to be reproduced is illuminated, either from the front or the back, depending upon whether it is opaque or transparent, by a suitable light from a light source 28. The reflected or transmitter light from the subject is passed through a color separating member 29, such as a monochromator or filter selector unit having a plurality of filters, which separates the light sequentially into N number of bands of the spectrum where N is equal to the number of colors deemed necessary to reproduce the original, plus one.

As was stated hereinbefore in connection with the photocells of Figure 1, the actual number of color bands in which the subject is sensed is directly dependent upon the number of primary, secondary and tertiary colors deemed necessary to reproduce the original. In this instance, this would determine the number of spectral color filters required.

As was also mentioned earlier, it is believed that eight color bands are sufficient for high quality commercial work. Therefore, for the purpose of simplifying the further description and with no intention of limiting the scope of this invention, the device will be considered as utilizing eight color bands for the color recognition and correction purposes.

One particular form of the color separating member may comprise a series of eight filters, one for each spectral band required, which may be arranged on a disc, for example, which is mounted for rotary indexing motion whereby each filter will be positioned in the path of the reflected or transmitted beam of light in predetermined logical sequence and with direct relation to the functions of the other elements of the apparatus. Each individual filter will transmit only a certain wave length portion of reflected or transmitted light to an optical assembly 30 which collects or collimates the rays and focuses them on the light sensitive surface or target of a television, i.e., vidicon camera tube 31, which scans the light image applied thereto and converts the same into electrical energy which varies in magnitude.

Although the schematic illustration in Figure 2, discloses only the camera tube of a closed circuit television system, it will be understood that all of the integral and essential elements of such an assembly, such as a video amplifier, deflection amplifiers and horizontal and vertical sync pulse generators, etc., are included for controlling the electron beam of the tube and to create the necessary sync pulse signals.

Depending upon the number of filters used and, therefore, the number of bands of the spectrum by which the subject is to be sensed, a corresponding number of light images are formed sequentially on the target of the camera tube each corresponding to a selected band width of the spectrum and each frame thus formed is converted into a latent electrostatic image and reading and erasing of the image are accomplished simultaneously by scanning the target with a primary beam (i.e., if a vidicon camera tube is used) to convert the light energy falling upon the sensitive surface of the tube into a corresponding electrical signal.

It will be noted that the apparatus thus far described operates in sequential fashion with an image corresponding to each color filter being focused on the camera tube and then scanned in logical sequence. However, subsequent operations require that the respective electrical signals, corresponding to the individual light images, be reproduced and acted upon simultaneously. Therefore, each individual electrical signal emitted by the camera tube must be recorded in such manner that after all of the required signals have been recorded they can all be reproduced simultaneously. Any one of several well known systems may be used for this purpose, such as the magnetic tape recording system 32 which is illustrated in the drawing merely by way of example. In this system the individual signals are recorded on individual magnetic tape tracks along with a master recording, on a separate track, of the horizontal, vertical, blanking, retrace and equalization synchronizing pulses.

After all of the signals, eight in this example, plus the master control signal, have been recorded on their individual tape tracks, either by means of a single recording amplifier which may be stepped from one magnetic tape recording head to another or by a plurality of recording amplifiers, the eight recorded signals are played back simultaneously through eight play back heads and fed into a modifying circuit amplifier unit 33 wherein, for each particular color separation record, i.e., yellow, cyan and magenta, the individual signals are amplified in accordance with predetermined amplification factors calculated in accordance with the reflectivity characteristics of the pigments and paper to be used in making reproductions.

The resultant signals are then fed into a summing circuit unit 34 wherein the eight respective signals are combined in accordance with the sign of their respective amplification factors. The resultant two signals are then fed into a summing amplifier unit 35 wherein they are combined algebraically to produce a single valued signal representing a particular, corrected color separation record, yellow for example. This signal is or may be fed through a conductor 36 to a recording head in the memory unit 32 and recorded on a separate individual tape track.

The same sequence would be followed for each of the other separation records. In other words after the yellow separation signal was recorded on the magnetic tape, the eight original signals would again be played back simultaneously through another series of amplifiers in the modifying circuit unit 33 wherein they would be amplified in accordance with predetermined amplification factors established for producing the magenta separation, for example, then combined and recorded on another track on the magnetic tape, etc., until all of the color separation signals for the four color separations have been recorded on separate tracks on the magnetic tape.

The four color corrected separation signals, along with the master control signal, are then played back sequentially by suitable play back heads and amplifiers and fed through a conductor 37 to the picture tube 38 to produce four color corrected separation records. At this point the color separation signal is used to modulate the intensity of the electron beam whereas the master control signal, synchronizes the respective sweep amplifiers so that the beam of the picture tube will be activated in precisely the same sequence as that of the camera tube.

The image thus formed on the face of the picture tube is focused through an optical assembly 39 onto the surface of a light sensitive film or transparency 40 to thereby create a permanent corrected, color separation record. Preferably the film would be mounted for indexing motion so that after each separation record is completed it would be moved automatically into position for the next exposure.

Control of the entire apparatus is governed by a master sequence control unit 41 which is connected to the respective units so as to activate them in the proper sequence as the various functions are performed.

In the description thus far it will be noted that the color separation signals emitted by the summing circuits are first recorded on separate tracks of the magnetic tape for subsequent sequential play back to control the picture tube. This is a definite advantage because it permits the making of the tape at one location after which it may be shipped to any destination and used to create the corrected separation transparencies on another apparatus, or the tape could be removed and stored indefinitely, thus providing a permanent record.

As an alternative, however, the color separation signal may be fed directly from the summing amplifier 35 to the picture tube 38 or an equivalent writing element such as was mentioned hereinbefore in connection with Figure 1, through a conductor 42, without going through the magnetic tape recording unit for permanent recording.

Instead of using the camera tube assembly, as shown in Figure 2, for converting the series of light images of the subject into corresponding electrical energies, a photocell array and associated rotary switching mechanism as disclosed in Figure 3, may be used to effect the viewing and scanning of the original subject. In this instance the light energy transmitted by or reflected from the subject 10 would be focused by means of an optical assembly 12 through a color filter selector unit 44 and impinged upon the surface of an array of photocells 45. These cells, which would be very small in size, would be arranged in vertical and horizontal rows and each individual cell in any given horizontal row would be connected to a common conductor for that row whereas each cell in any given vertical row would likewise be connected to a common conductor. Thus, in the illustration in Figure 3, there would be twenty conductors leading from the photocell array, one for each of the ten vertical rows and one for each of the ten horizontal rows. For convenience, however, only four conductors and their associated rotary brush commutator assemblies are shown.

The energy from each individual cell is "picked off" in logical scanning sequence by means of the rotating brush commutator assemblies 46 and 47. Each such assembly would comprise a series of commutator discs 48, one for each vertical and one for each horizontal row of cells respectively, and as the coacting rotary brushes 49 contacted the individual segments on the respective commutators, circuits would be completed sequentially with each individual photocell.

As each row of cells is scanned, stepping switches 50 and 51 would be indexed automatically to switch the circuit to the conductor and commutator for the next row of cells, etc., until the whole array had been scanned. These energies are then fed into an amplifier unit 52 wherein they are amplified and then fed to a memory unit such as 32 in Figure 2 for recording upon a magnetic tape track or the like.

This sequence would be repeated eight times, once for each different filter on the selector 44, and after each image is scanned, the filter selector 44 would be indexed automatically to the next position until all eight of the images have been scanned and recorded on the magnetic tape. From this point on, the sequence would be the same as described in connection with Figure 2.

In Figure 4 there is illustrated another modification of the viewing means or unit whereby a light image of the original subject to be reproduced, is separated into the required number of spectral components and then converted into corresponding electrical or video signals for further processing to produce a corrected primary color separation.

In this system the subject 10 is suitably illuminated by a suitable light, the reflected or transmitted rays of which are focused by means of an optical assembly 53 through a series of dichroic mirrors 54. In the embodiment shown, there are eight such mirrors, each one of which is adapted to reflect light of a predetermined spectral wave length, while permitting the remaining light to pass through. Thus the original reflected image is separated into eight discrete color band image representations which combine to form the complete spectrum and each individual image is in turn deflected by means of a simple front face mirror 55 onto a corresponding row or line of photocells 56.

Each row of photocells preferably is comprised of a large number of individual photocells arranged side by side in a single line and the individual photocells in each row are scanned in regular sequence by means of a rotary switch 57. The latter may comprise one member containing commutator segments connected to the respective photocells and a rotating brush for sequentially connecting each individual photocell corresponding to the same point or element of the subject images in the eight color bands, to a modifying and computing system such as is illustrated in Figures 1 and 2.

In order to effectively scan the entire image the rows of photocells may be mounted on a common support which is indexed intermittently after each line is scanned to move the photocells into position to scan the next line, etc.

As an alternative to moving the photocells, the original subject may be arranged to be illuminated a line at a time in which case the subject would be indexed relative to the illuminating line of light. Thus the photocells would remain stationary and after each line is scanned the subject would be indexed relative to the light to illuminate the next succeeding line, etc. In either case the extent of movement of the photocells or of the subject would be equal to that cross sectional width commensurate with the desired resolution, so that the entire surface of the subject would be progressively scanned, a line at a time.

In Figure 5 there is disclosed another scanning arrangement which is similar to the system shown in Figure 4 in that it utilizes eight rows or lines of photocells for converting a corresponding number of light images into video signals. According to this system, however, the photocell rows 58 are arrayed radially in a circular arrangement and all of the optics 59 and filter means 60 would be directed toward a common focal plane or line on the surface of the subject 61.

Although the illustration in Figure 5 shows only two photocell rows and their associated optics and filters, it will be understood that there would be at least eight such assemblies arranged in circular fashion, and each would include a spectral color filter 60. In this manner, eight discrete spectral color images, covering the full spectrum, would be created simultaneously, and by means of the mirrors 62, they would be impinged on the faces of the respective photocell rows 58. As in Figures 3 and 4, the scanning action of the individual photocell rows would be effected and synchronized through a series of rotary switches and the resultant signals fed into the modifying and computing circuits. In this embodiment also, scanning of the complete image would be accomplished line by line either by moving the rows of photocells in unison relative to the respective light images, or by moving the subject relative to a line of illumination.

A further variation of the scanning unit is disclosed in Figure 6. In this system the subject 63 is illuminated by a flying spot cathode ray tube 64 or a galvanometer mirror suspension and light whereby each elemental area of the subject is scanned in logical sequence. In this case, however, the beam of the flying spot scanner tube would have only horizontal sweep action and the subject, as indicated, would be translated at right angles to the scanning beam so as to progressively scan the entire image.

The reflected light is directed through a color filter 65 and impinges upon a phototube 66 having a long photosensitive cathode surface. As the reflected spot of light moves along the photosensitive surface of the phototube, a substantially continuous electrical signal is emitted which varies in intensity in proportion to variations in intensity of the reflected light beam as it scans the surface of the subject. With this system the resultant signal would be fed directly to the modifying and computing circuits and the need for rotary switches such as are required when a row of individual photocells are used, would be eliminated. It will be appreciated that for color separation work the reflected light would be separated into its spectral components, either by means of filters or dichroic mirrors and that eight or more phototubes 66 would be arranged to scan a corresponding number of color images as in Figures 4 and 5.

Although the various scanning systems disclosed in Figures 3 to 6 inclusive have been illustrated and described in association with color separation and correction apparatus, it will be evident that such scanners can be used for other purposes as well. For example, such systems can be used in facsimile apparatus for transmitting black and white pictures or other information as well as in conjunction with various types of electronic computing machines or any other machines which require the conversion of visual or light images into corresponding electrical energies.

Moreover, the precise structure of the photocell rows, for example, will depend upon the resolution required in the finished product. For high quality color reproductions, the individual photocells may be as small as .007 to .010 inch in width, with as many as 500 to 1000 such cells per row. In other applications perhaps photocells as large as 1/16 to 1/8 inch width with a correspondingly fewer number per row, may suffice.

Having thus described, in simplest terms, several variations of this invention, it will be evident to others skilled in the art that various modifications may be made to suit particular requirements. Therefore, it is intended to claim all such changes insofar as they fall within the reasonable spirit and scope of the appended claims.

We claim:

1. Apparatus for producing corrected color separation records directly from a multicolor original, comprising, a spectral color separating medium, means for viewing the colored original through said medium to convert light images thereof corresponding in number to one plus the number of primary, secondary and tertiary colors necessary to reproduce the original into corresponding electrical energies, electronic means including amplifying and summing circuits for amplifying and algebraically combining all of said energies in accordance with predetermined amplification factors based on the reflectivity characteristics of the reproducing media to be used in reproducing the original to produce a single electrical signal representing a particular color separation record, and recording means responsive to said signal for converting said signal into a permanent recorded image.

2. Apparatus for producing corrected color separation records directly from a multicolored original subject comprising, a reading unit including a television camera tube for viewing the subject, and a light dispersion medium, the latter being spaced between the subject and said tube and functioning in a manner to sequentially produce on the image receiving element of said tube N number of spectral colored images of the subject where N is equal to one plus the number of primary, secondary and tertiary colors deemed necessary to reproduce the subject, said camera tube being constructed to convert the respective light images into corresponding electrical signals, computing means including amplifier circuits for modulating each of the separate electrical signals emerging from said reading unit in accordance with predetermined amplification factors based on the spectral reflectivity characteristics of the reproducing media, and mixing means for algebraically adding the amplified energies in accordance with the sign of said amplification factors to produce a varying single valued electrical signal representing a particular corrected primary color separation, and recording means including a recording element responsive to said single valued electrical signal for converting said signal into a color corrected separation record.

3. Apparatus for producing corrected color separation records directly from a multicolored original subject comprising a reading unit including a cathode ray type of image recording tube and a light dispersion medium, the latter being spaced between the original subject and said tube and functioning in a manner to sequentially produce N number of spectral colored images of the original subject on the image receiving element of said tube where N is equal to one plus the number of primary, secondary and tertiary colors deemed necessary to reproduce the subject, said image receiving tube being constructed and having operation to convert elemental areas of the light images into electrical energy signals, storage means for discretely storing the energy signals pertaining to each of the N images in synchronized manner for subsequent simultaneous reproduction of all N stored signals representing a single element of the colored original at a time, computing means for amplifying these individual energy signals in accordance with predetermined amplification factors based on the spectral reflectivity characteristics of the reproducing media, means for algebraically mixing the simultaneous signals in accordance with the sign of the predetermined amplification factors to produce a varying, single valued energy signal, and recording means responsive to said single valued signal for converting said signal into a permanent, corrected primary color separation record.

4. Apparatus for producing corrected color separation records directly from a multicolored subject comprising, a television camera tube, a spectral color filter assembly, the latter being spaced between the subject and said tube and functioning in a manner to sequentially produce on the image receiving element of said tube N number of spectral colored images of the subject where N is equal to one plus the number of primary, secondary and tertiary colors deemed necessary to reproduce the subject, said camera tube being constructed and having operation to convert elemental areas of the respective light images into corresponding electrical signals, magnetic tape recording means for discretely storing the electrical signals pertaining to each of the N images for subsequent simultaneous reproduction of all N stored signals representing a single element of the subject at a time, amplifying means for amplifying the individual electrical signals in accordance with predetermined amplification factors based on the spectral reflectivity characteristics of the reproducing pigments, means for algebraically mixing the simultaneous signals in accordance with the sign of said factors to produce a varying single valued energy signal representing a particular corrected primary color separation, means for recording said single valued signal by said magnetic tape recording means for subsequent reproduction, and recording means responsive to said signal for converting the latter into a permanent, corrected, primary color separation record.

5. Apparatus as set forth in claim 4 wherein said recording means comprises a television picture tube, the electron beam of which is intensity modulated by the single valued signal to expose a photosensitive transparency.

6. Apparatus for producing corrected color separation records directly from a multicolor original including reading means for viewing the colored original and writing means for creating the separate color separation records, said reading means including a light source for illuminating the original, optical means for scanning the original, a prism associated with said optical means for converting the light beam emitted by said original into its corresponding spectrum, and a series of photo-electric cells, corresponding in number to one plus the number of primary, secondary and tertiary colors necessary to reproduce the original, for converting the light images in the respective selected bands of the spectrum into corresponding electrical signals, storage means for discretely storing the electrical signals pertaining to each of the images in a synchronized manner, means subsequently operable for simultaneously reproducing all of the stored signals representing a single element of the colored original at a time, electronic amplifying means for amplifying the respective signals in accordance with predetermined amplification factors based on the reflectivity characteristics of the media to be used in reproducing the original, and electronic summing means for mixing all of said signals in accordance with the sign of their amplification factor to produce a single electrical signal representing a particular color separation record, said writing means being activated by said single electrical signal to produce a permanent color separation record.

7. Apparatus as set forth in claim 6 wherein said writing means is comprised of a glow lamp which is intensity modulated by the single electrical signal to expose a light sensitive color separation negative.

8. Apparatus as set forth in claim 6 wherein said writing means includes a hot stylus which is activated by the single electrical signal to record the color separation image directly on a printing plate.

9. Apparatus for producing corrected color separation records directly from a multicolor original including reading means for viewing the original and exposing means for exposing a light sensitive material, said reading means including a light source for illuminating the original, a television camera tube, an optical system for focusing the light emitted from the original onto the target of said camera tube, and a series of color filters for separating said emitted light into its spectral components, the number of said filters and thus the number of images focused sequentially on the target of said camera tube for a given color separation record being equal to one plus the number of primary, secondary and tertiary colors necessary to reproduce the original, said camera tube being constructed and having operation to scan the respective images on the target thereof in sequence and convert them into corresponding electrical signals, a memory unit comprising a magnetic tape recorder for recording the electrical signals in logical sequence, means for reproducing all of said signals simultaneously, and electronic means for amplifying and combining said signals in accordance with predetermined amplification factors to produce a single electrical signal representing a particular color separation, said signal being adapted to modulate the intensity of said exposing means to produce a permanent primary color separation record.

10. Apparatus for producing corrected color separation records directly from a multicolor original including reading means for viewing the original and exposing means for exposing a light sensitive material, said reading means including a light source for illuminating the original, a television camera tube, an optical system for focusing the light emitted from the original onto the target of said camera tube, and a series of color filters for separating said emitted light into its spectral components, the number of said filters and thus the number of images focused on the target of said camera tube for a given color separation record being equal to one plus the number of primary, secondary and tertiary colors necessary to reproduce the original, the said camera tube being constructed and having operation to scan the respective images on the target thereof in sequence and convert them into corresponding electrical signals, a memory unit comprising a magnetic tape recorder for recording the electrical signals in logical sequence, means for reproducing all of said signals simultaneously, amplifying means for amplifying all of said signals in accordance with predetermined amplification factors based on the reflectivity characteristics of the media to be used in making the reproduction, and electronic means for algebraically combining said signals in accordance with the sign of their amplification factors to produce a single electrical signal representing a particular color separation, said signal being adapted to modulate the intensity of said exposing means to produce a permanent primary color separation record.

References Cited in the file of this patent

UNITED STATES PATENTS

| | | |
|---|---|---|
| 2,072,528 | Nicolson | Mar. 2, 1937 |
| 2,082,692 | Finch | June 1, 1937 |
| 2,434,561 | Hardy | Jan. 13, 1948 |
| 2,567,240 | Sites | Sept. 11, 1951 |
| 2,691,696 | Yule | Oct. 12, 1954 |
| 2,710,889 | Tobias | June 14, 1955 |
| 2,734,941 | Zenel | Feb. 14, 1956 |

FOREIGN PATENTS

| | | |
|---|---|---|
| 812,987 | France | Feb. 15, 1957 |

OTHER REFERENCES

A System for Recording and Reproducing Television Signals, R.C.A. Review, March 1954, pages 3 to 17.